Patented Mar. 3, 1936

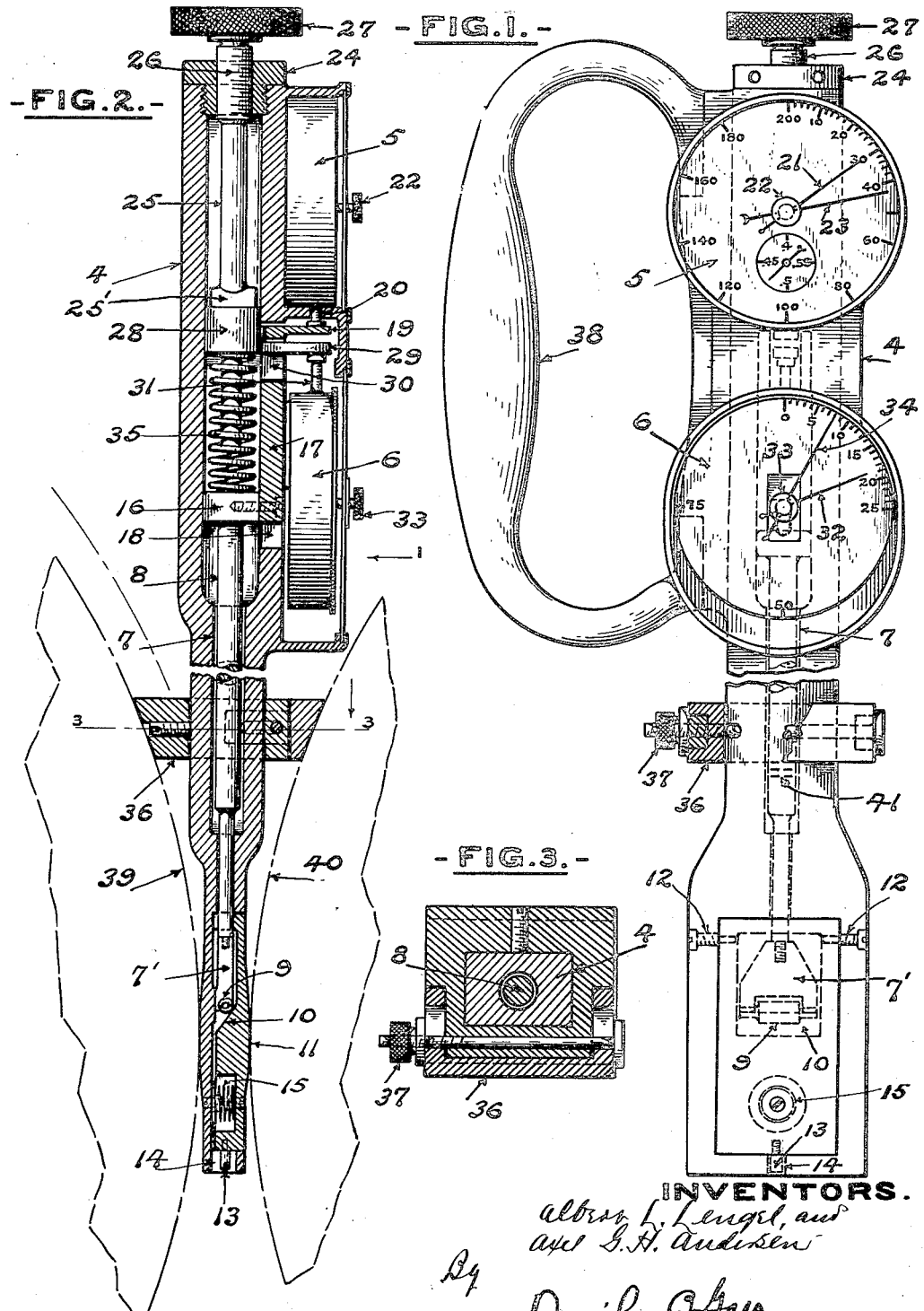
March 3, 1936. A. L. LENGEL ET AL 2,032,584
DISTANCE AND IMPRESSION GAUGE
Filed Dec. 4, 1931

2,032,584

UNITED STATES PATENT OFFICE 2,032,584

DISTANCE AND IMPRESSION GAUGE

Albert L. Lengel, Oakland, Calif., and Axel G. H. Andersen, Brooklyn, N. Y., assignors to R. Hoe & Co., Inc., New York, N. Y., a corporation of New York; Irving Trust Company, permanent trustee Application December 4, 1931, Serial No. 579,076

6 Claims. (Cl. 73—151)

This invention relates generally to measuring instruments, and particularly to a combined distance and impression gauge.

The invention is adaptable particularly for use in connection with printing presses, being designed for the purpose of obtaining accurate measurements for lining up the supporting shafts of adjacent cylinders thereof, as well as for the purpose of accurately determining the distance between cylinders in obtaining the desired pressure between a printing plate face and the impression or blanketed cylinder.

It is the primary object of the present invention to provide a single instrument whereby these separate functions may be easily, quickly and accurately accomplished.

With these objects in view, together with others which will appear as the description proceeds, the invention consists in the novel construction, combination and arrangements of parts, all as will be described more fully hereinafter, illustrated in the drawing and particularly pointed out in the claims.

In the drawing:—

Figure 1 is a front elevation, parts broken away, of an instrument embodying the inventive idea, Figure 2 is a longitudinal sectional view taken through the instrument for indicating diagrammatically the manner in which the same is associated with adjacent cylinders in performing its functions, and Figure 3 is a transverse sectional view on a slightly enlarged scale, the view taken substantially upon line 3—3 of Figure 2.

Referring now more particularly to the drawing, the measuring and indicating device is embodied in an elongated casing, shell or body indicated at 4. This body carries an indicator 5 from which may be ascertained the exact distance between cylinder rolls, and a pressure dial 6 to indicate the pressure required between the rolls to obtain a desired pressure upon the blanket of the impression roll cylinder.

In the accomplishment of these results, the body 4 is provided with a longitudinally disposed bore 7, in the lower end of which a rod 8 is mounted for reciprocation. A block 7' is secured to the lower end of this rod and carries a roller 9 contacting an angular or bevel face 10 upon the inner side of the jaw 11 of an expansible element which may be referred to generally as a measuring element. This jaw is pivoted at its upper end as at 12 to the body, and its lower end is provided with an outwardly extending stud 13 disposed within an elongated aperture or slot 14 in the extreme end of the body. An expansion spring 15 is interposed between the jaw and the body.

The upper end of the rod 8 is provided with a head 16, to one side of which is connected a plate 17 slidable within a slot 18 in the body 4. The upper end of this plate has an outwardly or right angularly disposed arm 19 normally engaged with the lower end of a plunger 20 operatively connected with the indicating mechanism of the linear measuring instrument 5. The mechanism per se of this instrument 5 is unimportant from the standpoint of the present invention, as such instruments are familiar and well known in the accurate indicating of linear measurements. The instrument 5 may be equipped with a manually adjustable hand 21, which may be readily set by operation of the thumb wheel 22, while the measurements indicated by the instrument will be displayed by the hand 23 traveling around a dial provided with suitable graduations.

The bore of the body at the outer end thereof is closed by an internally threaded cap screw 24 through which extends a shaft 25 having a threaded portion 26 engageable in the threaded cap screw, and with a knurled knob 27 at its outer extremity by means of which the shaft may be manually rotated. A head 25' is formed on the lower end of the shaft 25 and bears against a non-rotatable head 28 slidable within the bore. From one side of the said head 28 a finger 29 projects through an opening or aperture 30 in the plate 17. This finger 29 contacts the outer end of the operating plunger 31 associated with the pressure indicating instrument or dial 6, the latter being carried by the plate 17. The instrument 6, like the instrument 5, is of standard well known construction, and is of that type wherein pressure in fractions of pounds will be indicated upon manipulation of plunger 31. This gauge may also be equipped with a hand 32 capable of being manually set by operation of a thumb wheel 33 carried by the gauge, while the hand 34 indicates the fractions of pounds pressure to which the instrument is subjected in its penetration of the blanket.

The head 28 and rod 8 have interposed therebetween an expansion spring 35, which spring yieldably maintains the rod 8 with its lower end engaged with the bevel face 10 of the jaw.

The exterior of the housing or body is equipped with a slidable stop 36, capable of being held in its various positions of adjustment by operation of the thumb screw 37. The body may also be provided with a suitable handle 38 by means of which the same may be conveniently manipulated in obtaining the measurements and readings for which the instrument is designed.

In describing the operation of the device let it be assumed that the cylinder 39 will carry the printing plate while the cylinder 40 is the impression cylinder clothed with a blanket as is well known. In determining the distance between the operative faces of these cylinders, and having a knowledge of the thickness of the printing plate to be carried by cylinder 39, the manually adjustable hand 21 on dial 5 will be set to indicate this plate thickness. The stop 36 will be adjusted longitudinally upon the body corresponding to the cylinder diameters, which may be indicated by calibrations as at 41, whereupon the lower end of the instrument is inserted between the rolls or cylinders until the stop 36 contacts the same. It will be understood that the spring 35 normally forces rod 8 in a downward direction, thus holding the lower end thereof in contact with inclined face 10. With the body portion of the operative end of the instrument engaged with the periphery of cylinder 39, the movable jaw 11 will be pressed in by engagement with the other cylinder commensurate with the distance between the two cylinders, which distance will be indicated by the automatic finger 23 on the dial 5 by reason of the upward sliding movement of rod 8 caused by engagement of bevel face 10 with the roller 9. The manually adjusted hand 21 will be set at a dimension corresponding with the thickness of the plate to be used less the distance estimated as a requirement for embedding the printing surface of the plate into the blanket sufficiently to produce the correct impression pressure.

Should the movement of the automatic finger 23 not coincide with the manually adjusted finger 21, the rolls or cylinders will be moved in such direction and to such degree as will be required to cause the automatic finger to overlie the manually adjusted finger 21.

To obtain the impression measurement between the cylinders, which will vary according to the elastic properties of the impression cylinder blanket, the lower end of the instrument is applied between the rolls in precisely the same manner as heretofore described. The thumb wheel 27 is turned causing the head 28 to move down, compressing spring 35 and correspondingly moving rod 8 which carries gauge 6. The spring pressure on the rod 8 will tend to imbed the movable jaw 11 in the face of the cylinder blanket, and the degree of pressure required for this penetration or imbedding will be indicated in pounds or fractions of pounds pressure upon the gauge 6 by hand 34 moved by finger 29 operating upon the plunger 31. Operation of the thumb wheel 27 will continue until the reading on the dial 5 by hand 23 corresponds with the thickness of the plate that will be used as indicated by hand 21. The longitudinal motion of shaft 25 with respect to the longitudinal motion of rod 8 is proportional to the pressure required to embed the jaw face into the blanket which pressure is indicated upon the gauge 6.

It is now manifest that a relatively simple and compact instrument is provided which will accurately indicate the impression pressure which the surface of the impression cylinder blanket will exert against the face of the stereotype plate. The operator, knowing the thickness of the stereotype plate, will make a rough adjustment so that the distance between the adjacent peripheries of the plate and the blanket impression cylinders will be somewhat less than the thickness of the plate. Then the measuring device is placed between the peripheries of these cylinders and the thumb wheel is turned to exert a pressure against the calibrated spring 35. As this spring is compressed, the head 28 and finger 29 move inwardly thereby operating the indicator dial 6 through the instrumentality of its plunger 31. As the spring is compressed it imparts a downward pressure to the rod 8 and consequently an outward pressure on the jaw 11, and a continued compression of the spring will cause the jaw 11 of the measuring device to embed itself in the blanket until the distance between the peripheries of the two cylinders is equal to the thickness of the stereotype plate, less the depth of the impression. Inasmuch as the rod 8 is operably connected with the indicator dial 5, the distance between the peripheries of the cylinders is indicated thereon and since the pressure indicating dial 6 is operably connected with the head 28, the total deflection of the spring would be indicated thereon, thereby indicating in pounds accurately what blanket compression will be exerted by the stereotype plate when the blanket has been compressed to provide a distance between the peripheries of the cylinders equal to the thickness of the stereotype plate, less the depth of the impression. If, in the operator's judgment, the indicated impression pressure is insufficient, the cylinders are adjusted through well known instrumentalities to bring them closer together, and, on the other hand, if the operator has determined that the impression pressure is excessive, this may be relieved by adjusting the cylinders away from each other.

From the foregoing it is apparent that we have provided a gauge of extremely simple construction and operation which is fully capable of ascertaining accurate figures for adjustment of the plate and impression rolls for the two desired purposes. The instrument herein described, however, is susceptible of changes in the details of construction and assemblage of parts without departing from the spirit of the invention as defined by the appended claims.

Having thus described our invention, we claim:

1. In a gauge, a body having a longitudinal bore, a movable jaw at one end of said body, a rod slidable in said bore and operatively connected at one end with said jaw, a shaft threaded in said bore in alignment with said rod and operable from the exterior of said body, a linear indicator on said body, an apertured plate connected to said rod and operatively associated with said indicator, a finger movable by said shaft and projecting through the aperture of said plate, a gauge carried by said plate, an operating plunger on said gauge to be operated by said finger, a spring interposed between said shaft and said rod, and limiting means adjustably mounted on said body.

2. In a gauge for indicating the pressure between two cooperating cylinders and the distance between two opposing points on these cylinders and including a frame, a dial having a pressure-indicating hand, a dial having a distance-indicating hand, said frame having a portion for insertion between the cooperating cylinders to contact with one, a movable jaw on said frame adapted to contact with the other cylinder, a member operably associated with said jaw and with the indicating hand of one of said dials, and means adapted to apply pressure upon said member to urge it into engagement with said jaw and operably associated with the indicating hand of the other of said dials.

3. In a gauge, a body including an expansible end adapted to be inserted between a pair of objects, a rod movable upon said body for expanding said end, a distance gauge on said body and means whereby the degree of expansion of said end will be indicated on said gauge, a shaft on said body alined with said rod, a spring interposed between said rod and shaft, a second gauge associated with the rod and shaft and responsive to deflections of said spring whereby the degree of pressure exerted by said expansible end will be indicated on said second gauge, said shaft adapted to be moved manually.

4. In a gauge, a body having an expansible end adapted to be inserted between a pair of objects, a distance dial carried by said body, means associated with and operable by said end for indicating upon said distance dial the degree of contraction or expansion of said end, mechanism including a deformable member for operating upon said means tending to expand said end, and a pressure dial associated with said mechanism, and means for indicating on said pressure dial the degree of pressure exerted by said end.

5. In a gauge, a body having an end adapted to be inserted between a pair of objects, an element on said end capable of expanding or contracting relative to said body, a distance dial carried by said body, a rod slidable on said body, said rod being operably associated with said element to be moved in one direction thereby when the element contracts and capable of expanding said element when moved in the opposite direction, means connecting said rod with said distance dial to indicate thereon the degree of contraction or expansion of said element, a member for manually moving said rod tending to expand said element, a yieldable device interposed between said member and said rod, and a pressure dial associated with said member and said rod for indicating upon the pressure dial the degree of pressure expended in the expansion of said member.

6. In a gauge, a body adapted to have one end inserted between a pair of objects, an element on said end movable relative thereto, a distance dial on said body, a rod movable upon said body and connected at one end with said element so as to move simultaneously therewith, means for indicating upon said dial the degree of movements of said rod, a spring associated with said rod and resisting the movement thereof in one direction, means for varying the tension of said spring, a pressure dial movable with said rod, and an element on said tension varying means operatively associated with said pressure dial whereby such variations will be indicated on the latter.

ALBERT L. LENGEL.
AXEL G. H. ANDERSEN.